(12) United States Patent
Kato

(10) Patent No.: US 6,680,101 B1
(45) Date of Patent: Jan. 20, 2004

(54) MOLDED HONEYCOMB MATERIAL AND PROCESS FOR PRODUCTION THEREOF

(75) Inventor: Shigeki Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/560,999

(22) Filed: Apr. 28, 2000

Related U.S. Application Data

(63) Continuation-in-part of application No. 09/556,077, filed on Apr. 21, 2000, now abandoned.

(30) Foreign Application Priority Data

Apr. 28, 1999 (JP) ............................................. 11-121196
Nov. 29, 1999 (JP) ............................................. 11-337726

(51) Int. Cl.$^7$ ................................................. B32B 3/12
(52) U.S. Cl. ....................... 428/116; 428/34.4; 428/188; 264/631; 264/630; 264/638; 264/669; 264/670; 55/523; 55/524; 422/180; 422/222
(58) Field of Search ................................. 428/116, 118, 428/188, 34.4; 264/629, 630, 631, 638, 669, 670; 55/523, 524; 422/168, 177, 180, 211, 222

(56) References Cited

U.S. PATENT DOCUMENTS

| 4,158,688 A | | 6/1979 | Pett et al. |
| 4,293,513 A | * | 10/1981 | Langley et al. |
| 4,582,677 A | | 4/1986 | Sugino et al. |
| 4,784,812 A | * | 11/1988 | Saitoh et al. |
| 5,019,537 A | | 5/1991 | Kato et al. |
| 5,602,197 A | | 2/1997 | Johnson et al. |
| 5,723,083 A | * | 3/1998 | Bogan, Jr. et al. |
| 5,935,514 A | * | 8/1999 | Ford, Jr. et al. |
| 6,004,896 A | * | 12/1999 | Addiego |
| 6,132,695 A | * | 10/2000 | Barrera et al. |

FOREIGN PATENT DOCUMENTS

| JP | 59-169972 | 9/1984 |
| JP | 61-261250 | 11/1986 |

\* cited by examiner

*Primary Examiner*—Deborah Jones
*Assistant Examiner*—Wendy Boss
(74) *Attorney, Agent, or Firm*—Burr & Brown

(57) ABSTRACT

A molded honeycomb material is obtained by subjecting a mixture of a raw material powder and a binder to extrusion molding. In the honeycomb material, no open pores are present, and the binder includes a thermoplastic material which is molten at the molding temperature. A process for producing the above molded honeycomb material includes heating a mixture of a raw material powder and a binder to a molding temperature to melt the binder, subjecting the mixture to extrusion molding, and cooling and solidifying the extrudate. The honeycomb material has a small partition wall thickness and can be mass-produced without impairing the product quality.

14 Claims, No Drawings

MOLDED HONEYCOMB MATERIAL AND PROCESS FOR PRODUCTION THEREOF

CROSS REFERENCE TO RELATED APPLICATION

This is a continuation-in-part application of U.S. Ser. No. 09/556.077, filed Apr. 21, 2000, now abandoned, the entirety of which is incorporated herein by reference.

BACKGROUND OF THE INVENTION

The present invention relates to an extrusion-molded honeycomb material used, for example, as a catalyst carrier for automobile exhaust gas purification, as well as to a process for producing the honeycomb material.

In recent years, the regulation of exhaust gases has become stricter for environmental protection. In this connection, a catalyst for exhaust gas purification having a higher purification ability is required. Meanwhile, an engine of lower fuel consumption and higher output is required strongly. To respond to such a situation, the catalyst for exhaust gas purification is required to show lower pressure loss in addition to the higher purification ability.

To satisfy these requirements, it is vigorously desired to allow the honeycomb structure used in the catalyst for exhaust gas purification to have a thinner partition wall so that the honeycomb structure can enable easier gas flow and lower pressure loss and the catalyst can have a lighter weight and lower heat capacity and can have a higher purification ability during engine warm-up. The partition wall thickness of honeycomb structures has heretofore been 150 $\mu$m (6 mil) mainly, but it is shifting to 50 $\mu$m (2 mil) mainly. Incidentally, "honeycomb structure" refers to a structure in which a large number of cells are separated by partition walls.

A honeycomb structure is ordinarily produced by mixing a raw material powder (e.g. a ceramic powder or a metal powder) with a binder or the like, subjecting the resulting mixture to extrusion molding through a die having lattice-like slits, and drying and firing the resulting extrudate. As the above binder, there has been used a water-soluble thermosetting methyl cellulose type binder.

As the partition wall of honeycomb structure becomes thinner, the width of the slits of the die needs to be smaller. Therefore, in molding a honeycomb structure having a thin partition wall, it is required to use a binder of high fluidity which can quickly flow into a die. Further, as the partition walls of honeycomb structures become thinner, the fresh extrudate from the die has a lower strength and tends to deform due to its own weight. Therefore, it is necessary to use a binder of high shape retainability which can solidify quickly after leaving the die.

Hence, it has been conducted to mold a honeycomb structure by using a molding material of high hardness and higher shape retainability, or a molding material of low hardness and high fluidity. Such molding materials, however, have had the following problems. A molding material of high hardness is inferior in fluidity; therefore, (1) it does not flow into a die easily, resulting in low productivity and (2) it requires a high molding pressure and repeated molding brings about deformation or wear of the die.

A molding material of low hardness must be hardened by thermal gelation of the binder contained in the molding material, by way of dielectric drying, to allow the extrudate from the die to have a desired strength. In this case, the transfer of the extrudate to a dielectric dryer is conducted with a gas flow applied to the extrudate from below the extrudate to prevent the deformation of the extrudate caused by its own weight. As a result, the extrudate comes to have cracks caused by drying at the portion to which the gas flow is applied.

SUMMARY OF THE INVENTION

In view of the above situation, the present invention aims at providing a molded honeycomb material having a thin partition wall and a process for mass-producing such a honeycomb structure without impairing the honeycomb quality.

According to the present invention, molded honeycomb material is obtained by subjecting a mixture of a raw material powder and a binder to extrusion molding. No open pores are present in the honeycomb material, and the binder comprises a thermoplastic material which is molten at the molding temperature.

In the molded honeycomb structure of the present invention, the binder is preferably water-insoluble and is preferably a wax, a thermoplastic resin or a mixture thereof.

When the binder is a mixture of a wax and a thermoplastic resin, the mixing ratio of the thermoplastic resin in the binder is preferably 35 to 80% by weight, more preferably 40 to 70% by weight, further preferably 45 to 60% by weight. The raw material powder can be a ceramic powder (e.g. cordierite) or a metal powder.

The molded honeycomb material of the present invention can be used as a carrier for the catalyst for removing harmful substances and dust from an automobile exhaust gas.

According to the present invention, a process for producing the above-mentioned molded honeycomb material is also provided, comprising the steps of heating a mixture of a raw material powder and a binder to a molding temperature to melt the binder, subjecting the mixture to extrusion molding, and cooling and solidifying the extrudate.

DETAILED DESCRIPTION OF THE INVENTION

The molded honeycomb material of the present invention can be produced by subjecting a mixture of a raw material and a binder to extrusion molding. As the binder, a thermoplastic material is used which is molten at the molding temperature.

The thermoplastic material can be melted by heat and can have different viscosities at different temperatures. Therefore, it can have the desired fluidity by appropriately selecting the temperature which enables efficient mass production of a molded honeycomb material.

The molten thermoplastic material solidifies when cooled. Therefore, the binder can be easily solidified by rapidly cooling the extrudate with cold water, cold air or the like, before the extrudate deforms due to its own weight, whereby the extrudate can retain its shape.

In the present invention, a water-insoluble binder is used, which makes drying of the molded material unnecessary. In extrusion molding of a mixture of a raw material powder and a water-soluble binder (a mixture of a raw material and a binder is hereinafter called "raw material mixture"), foam in the raw material mixture must be removed by vacuum defoaming, and local drying taking place during vacuum defoaming hardens the dried portion and causes plugging of the die. In contrast, in extrusion molding of a mixture of a raw material powder and a water-insoluble binder, no local drying takes place, no plugging of the die takes place, and productivity is high. Incidentally, no vacuum defoaming is necessary in extrusion molding using a water-insoluble binder.

In the present invention, the specific water-insoluble binder is preferred to be a wax or a thermoplastic resin. As the wax, paraffin wax, microcrystalline wax, etc are preferred. As the thermoplastic resin, ordinary thermoplastic resins such as EVA, polyethylene, polystyrene, liquid crystal polymer, engineering plastics and the like are preferred. In the present invention, these binders can be used singly or in combinations of two or more kinds. An auxiliary agent such as a coupling agent, lubricant, dispersing agent or the like may be added to the binder.

In the present invention, when a mixture of a wax and a thermoplastic resin is used as the binder, the mixing ratio of the thermoplastic resin in the binder is preferably 35 to 80% by weight, more preferably 40 to 70% by weight, further preferably 45 to 60% by weight.

The reason why the above mixing ratio of the thermoplastic resin is preferred is that the amount of the thermoplastic resin in the binder influences the shape retainability and molding pressure during molding, as well as the amount of expansion, amount of cracks and adhesion to the setter during dewaxing and firing.

As the amount of the thermoplastic resin in the binder becomes larger, the shape retainability during molding is better, the molding pressure required is higher, and the amount of expansion and number of defects during dewaxing and firing are lower.

For the above reasons, the upper limit of the mixing ratio of the thermoplastic resin in the binder is set preferably at 80% by weight, more preferably at 70% by weight, further preferably at 60% by weight. Thereby, the shape can be retained and an increase in molding pressure can be prevented. As a result, a molded honeycomb material having a small partition wall thickness and large cell density can be satisfactorily obtained with no deformation of the extruder die.

When the mixing ratio of the thermoplastic resin in the binder is too large, the extrudate has a high temperature (a large heat stress), reducing the handleability.

In the present invention, the mixing ratio of the thermoplastic resin in the binder is set preferably at 35% by weight, more preferably at 40% by weight, further preferably at 45% by weight. Thereby, the amount of expansion, the amount of cracks and adhesion to setter during dewaxing and firing can be reduced.

In the present invention, the mixture of the raw material powder and the binder is extrusion-molded. In the mixture, the amount of the binder differs depending upon the kind of the binder used and the binder is added in such an amount that desired fluidity can be obtained.

In the present invention, a ceramic powder or a metal powder is preferably used as the raw material powder. As the ceramic powder, a powder of an oxide (e.g. cordierite, alumina or mullite) or a nitride ceramic (e.g. silicon nitride, silicon carbide or aluminum nitride) can be used. As the metal powder, a powder of Fe, Cr, Ni, Al or the like can be used.

In the present invention, a molded honeycomb material is produced by extrusion molding. The kneading apparatus used therein can be any apparatus as long as it allows heating and pressurization, and there can be used an ordinary kneader, a pressure kneader, a twin-screw continuous kneader and extruder or the like.

The molding apparatus used in the present invention can be any apparatus as long as it allows heating and pressurization and has an extrusion function. An extruder of plunger type, a pug mill, an injection molding machine, a single-screw continuous extruder, a twin-screw continuous kneader or the like can be used.

In the present invention, kneading and molding may be conducted simultaneously using, for example, a twin-screw continuous kneader and extruder which can conduct kneading and molding simultaneously.

In continuous molding, it is necessary to atomize the binder. The atomization can be conducted, for example, by spray-drying or freeze-grinding. There is no restriction as to the heating means of the molding apparatus, and the heating means may be a heater or circulation of a heating medium such as oil or the like.

The binder is appropriately selected depending upon the cell structure of the desired honeycomb. A molded material of smaller partition wall thickness and smaller cell density must have a larger strength for shape retention. In this case, therefore, the binder used therein needs to contain a higher content of a thermoplastic resin relative to a wax. For example, in producing a molded material having a partition wall thickness of 12 mil and a cell density of 300 cells/in$^2$, the binder can consist of a wax alone and molding is possible. In producing a molded material having a partition wall thickness of 4 to 1 mil and a cell density of 500 to 1,200 cells/in$^2$, however, a mixed binder of a wax and a thermoplastic resin is used, wherein the content of the thermoplastic resin is preferably 35 to 80% by weight, more preferably 40 to 70% by weight, further preferably 45 to 60% by weight. Needless to say, a satisfactory honeycomb material can be obtained even with a thermoplastic resin alone.

The molding temperature of the raw material mixture is determined by the kind of binder used. The molding temperature is about 60 to 100° C. when the binder is, for example, a wax alone or a mixture of a wax and an EVA. When a high-melting point thermoplastic resin is used, the molding temperature is about 280° C. in the case of a polyethylene, and about 350° C. in the case of a liquid crystal polymer. Use of a low melting point binder is favorable in view of handling and thermal stress considerations of the extrudate.

The kneading and molding temperature need be controlled so that the binder is not deteriorated.

The viscosity of the raw material mixture is determined depending upon the kind and amount of binder used and the molding conditions (temperature and pressure) selected, and is in a range wherein a honeycomb material can be molded. The amount of binder can be appropriately set depending upon the kind of the raw material powder.

In the present invention, the extrudate is cooled and solidified to prevent deformation of the extrudate. There is no restriction as to the method of cooling, and air cooling, water cooling (spraying) or the like can be used. Alternatively, the extrudate may be dropped into water for rapid cooling. Forced cooling is unnecessary depending upon the molding temperature used. The extrudate is pushed out from an extrusion molding machine ordinarily in a horizontal direction, but may be pushed out downward using a vertical molding machine.

The cooling temperature may be a temperature at which the binder solidifies. The difference between the molding temperature and the cooling temperature is preferred to be small in view of the small stress during cooling. The cooling rate is preferred to be small.

In the present invention, there is no particular restriction as to the sectional shape of the cell of the molded honeycomb material produced. The cell sectional shape may be a polygon (e.g. triangular, rectangular or hexagonal), a circle or the like. The cell density may be 300 to 2,000 cells/in².

The firing of the molded material is conducted, at low temperature ranges, under conditions where no cell cutting takes place, in view of the vaporization curve of the binder and, at high temperature ranges, under conditions where the intended porosity and thermal expansion coefficient, etc. can be achieved.

The dewaxing and firing of the molded honeycomb material can be conducted in an atmosphere (e.g. air, inert atmosphere or vacuum) which is appropriately selected depending upon the kind of the raw material powder used.

For example, when the raw material powder is a cordierite powder (an oxide), dewaxing is conducted in air and then firing is conducted in air. Ordinarily, dewaxing and firing are conducted simultaneously in a periodic kiln or a continuous kiln such as a tunnel kiln or the like.

In using the honeycomb structure produced, as a catalyst for automobile exhaust gas purification, a γ-alumna layer is formed on the cell partition wall. In the pores of the γ-alumna layer is supported a catalyst component (i.e., a noble metal such as platinum, rhodium, vanadium or the like) and the catalyst component is baked at a temperature of about 600° C.

The present invention is described in more detail below by way of Examples. However, the present invention is not restricted to these Examples.

EXAMPLES 1 TO 6

Molded honeycomb materials having circular ends and a rectangular cell sectional shape were produced using a cordierite powder as a raw material powder and a wax as a binder. The cell density and partition wall thickness of each molded honeycomb material are shown in Table 2.

First, a binder having an average particle diameter of 100 μm was added to a cordierite powder, so that the content of the binder in the raw material mixture became 22% by weight. The mixture was fed into a continuous kneader and extruder to conduct kneading and molding. The molding temperature was appropriately determined so as to match the raw material mixture and the desired cell structure. In this case, the molding temperature was 60° C. The weight ratio of the binder components was 90 (a paraffin wax produced by Nippon Seiro Co., Ltd.), 6 (a microcrystalline wax produced by Nippon Seiro Co., Ltd.) and 4 (oleic acid produced by Katayama Chemical Industries Co., Ltd.)

Next, the extrudate from the extruder die was allowed to cool. The molded honeycomb material obtained was examined visually for cell shape and roundness of outer diameter. The results are shown in Table 2. The molded material was fired at 1,430° C. for 3 hours to obtain individual honeycomb structures.

EXAMPLES 7 TO 12

Molded honeycomb materials similar to those of Examples 1 to 6 were produced in the same manner as in Examples 1 to 6 except that there was used, as the binder, a 1:1 (by weight) mixture of waxes and an EVA, and the molding temperature was 75° C. The weight ratio of the binder components was 45 (a paraffin wax produced by Nippon Seiro Co., Ltd.), 3 (a microcrystalline wax produced by Nippon Seiro Co., Ltd.), 48 (an EVA produced by DuPont-Mitsui Polychemicals Co.,Ltd.) and 4 (oleic acid produced by Katayama Chemical Industries Co., Ltd.) The cell density and partition wall thickness of each molded honeycomb material are shown in Table 2. The viscosity of the binder was measured using a flow tester. The measurement was made at temperatures of 60° C., 65° C., 70° C. and 75° C. using a capillary diameter of 1 mm. The results are shown in Table 1. Each molded honeycomb material obtained was examined for cell shape and roundness of outer diameter in the same manner as in Examples 1 to 6. The results are shown in Table 2. Each molded material was fired under the same conditions as in Examples 1 to 6 to obtain individual honeycomb structures.

TABLE 1

| Temperature | Viscosity of binder (dPa.s) | |
| --- | --- | --- |
| (° C.) | $981 \times 10^4$ Pa | $1961 \times 10^4$ Pa |
| 60 | No fluidity | 47000 |
| 65 | 20000 | 3400 |
| 70 | 7400 | 1800 |
| 75 | 4000 | 1400 |

EXAMPLES 13 TO 18

Molded honeycomb materials similar to those of Examples 1 to 6 were produced in the same manner as in Examples 1 to 6, except that an EVA was used as the binder, and the molding temperature was 110° C. The weight ratio of the binder components was 100 (an EVA produced by DuPont-Mitsui Polychemicals Co., Ltd.) and 5 (oleic acid produced by Katayama Chemical Industries Co., Ltd.) The cell density and partition wall thickness of each molded honeycomb material were as shown in Table 2. Each molded honeycomb material obtained was examined for cell shape and roundness of outer diameter in the same manner as in Examples 1 to 6. The results are shown in Table 2. Each molded material was fired under the same conditions as in Examples 1 to 6 to obtain individual honeycomb structures.

COMPARATIVE EXAMPLES 1 TO 6

Molded honeycomb materials having circular ends and a rectangular cell sectional shape were produced using a cordierite powder as a raw material powder and methyl cellulose (a product-of Shin-Etsu Chemical Co., Ltd.) as a binder. The cell density and partition wall thickness of each molded honeycomb material are shown in Table 2.

First, to a cordierite powder were added a binder and water so that the contents of the binder and water in the raw material mixture became 7% by weight and 30% by weight, respectively. The mixture was fed into a continuous kneader and extruder to conduct kneading and molding. The molding temperature was 20° C.

Next, the extrudate from the extruder die was dried. The molded honeycomb material obtained was examined for cell shape and roundness of outer diameter in the same manner as in Examples 1 to 6. The results are shown in Table 2. The molded material was fired under the same conditions as in Examples 1 to 6 to obtain individual honeycomb structures.

TABLE 2

| | Partition wall thickness (mil) | Cell density (cells/in$^2$) | Binder | Cell shape | Roundness of outer diameter |
|---|---|---|---|---|---|
| Example 1 | 12 | 300 | Wax | No deformation | No deformation |
| Example 2 | 4 | 900 | Ditto | No deformation | No deformation |
| Example 3 | 2 | 400 | Ditto | Big deformation | Big deformation |
| Example 4 | 2 | 900 | Ditto | Intermediate deformation | Intermediate deformation |
| Example 5 | 2 | 1200 | Ditto | Slight deformation | Slight deformation |
| Example 6 | 1 | 900 | Ditto | Big deformation | Big deformation |
| Example 7 | 12 | 300 | Wax + EVA (1:1) | No deformation | No deformation |
| Example 8 | 4 | 900 | Ditto | No deformation | No deformation |
| Example 9 | 2 | 400 | Ditto | No deformation | No deformation |
| Example 10 | 2 | 900 | Ditto | No deformation | No deformation |
| Example 11 | 2 | 1200 | Ditto | No deformation | No deformation |
| Example 12 | 1 | 900 | Ditto | Slight deformation | Slight deformation |
| Example 13 | 12 | 300 | EVA | No deformation | No deformation |
| Example 14 | 4 | 900 | Ditto | No deformation | No deformation |
| Example 15 | 2 | 400 | Ditto | No deformation | No deformation |
| Example 16 | 2 | 900 | Ditto | No deformation | No deformation |
| Example 17 | 2 | 1200 | Ditto | No deformation | No deformation |
| Example 18 | 1 | 900 | Ditto | No deformation | No deformation |
| Comparative Example 1 | 12 | 300 | Aqueous methyl cellulose | No deformation | No deformation |
| Comparative Example 2 | 4 | 900 | Ditto | No deformation | No deformation |
| Comparative Example 3 | 2 | 400 | Ditto | Big deformation | Big deformation |
| Comparative Example 4 | 2 | 900 | Ditto | Intermediate deformation | Intermediate deformation |
| Comparative Example 5 | 2 | 1200 | Ditto | Slight deformation | Slight deformation |
| Comparative Example 6 | 1 | 900 | Ditto | Big deformation | Big deformation |

As is clear from Table 2, no drying step was employed in the Examples, and the number of production steps was smaller in the Examples than in the Comparative Examples. Nevertheless, in the Examples, molded honeycomb materials having dimensional accuracies equal or superior to those of the Comparative Examples could be obtained. No difference in thermal expansion coefficient and open porosity of the sintered honeycomb material was seen between the Examples and Comparative Examples.

EXAMPLES 19 TO 25 AND COMPARATIVE EXAMPLE 7

Molded honeycomb materials having circular ends and a rectangular cell sectional shape were produced using a cordierite powder as a raw material powder and a wax as a binder. Each molded honeycomb material had a cell density of 600 cells/in$^2$ and a partition wall thickness of 2.0 mil.

First, a binder having an average particle diameter of 100 $\mu$m was added to a cordierite powder so that the content of the binder in the raw material mixture became 22% by weight. The mixture was heat-kneaded at a pressure of $1.0 \times 10^5$ Pa in a pressure kneader, cooled, then disintegrated in a jaw crusher, and passed through a single-screw extruder at the molding temperature and molding pressure shown in Table 3, to obtain molded honeycomb materials.

The binder was a mixture of a wax and an EVA (a product of DuPont-Mitsui Polychemicals Co., Ltd.) shown in Table 3.

The weight ratio of the binder components was 90 (a paraffin wax produced by Nippon Seiro Co., Ltd.), 6 (a microcrystalline wax produced by Nippon Seiro Co., Ltd.) and 4 (oleic acid produced by Katayama Chemical Industries Co., Ltd.).

The extrudate from the extruder die was allowed to cool. Each of the thus-obtained molded honeycomb materials was evaluated. The results are shown in Table 3.

TABLE 3

| | Molding | | | |
|---|---|---|---|---|
| | EVA amount (wt. %) | Temperature (° C.) | Pressure ($10^4 \times$ Pa) | Results |
| Example 19 | 35 | 64 | 686 | Good |
| Example 20 | 40 | 70 | 981 | Good |
| Example 21 | 45 | 72 | 1079 | Good |
| Example 22 | 50 | 75 | 1177 | Good |
| Example 23 | 60 | 83 | 1569 | Good |
| Example 24 | 70 | 92 | 1961 | High in temperature and slightly inferior in handleability |
| Example 25 | 80 | 100 | 2354 | Slight deformation of die |
| Comparative Example 7 | 25 | 60 | 490 | Deformation of cell |

Each molded honeycomb material was heated from room temperature to 500° C. at a rate of 50° C. per hour, from 500° C. to 1,200° C. at a rate 100° C. per hour and from 1,200° C. to 1,430° C. at a rate of 50° C. per hour, and kept at 1,430° C. for 3 hours, to conduct dewaxing and firing, whereby individual honeycomb structures were obtained. Each honeycomb structure was evaluated for amount of expansion, cracking in firing and adhesion to setter. The results are shown in Table 4.

TABLE 4

| | Dewaxing and firing | | |
|---|---|---|---|
| | Amount of expansion (%) | Cracking in firing | Adhesion to setter |
| Example 19 | 2.6 | Small defect inside | Adhesion |
| Example 20 | 2.4 | Small defect | slight adhesion |

TABLE 4-continued

| | Dewaxing and firing | | |
|---|---|---|---|
| | Amouont of expansion (%) | Cracking in firing | Adhesion to setter |
| Example 21 | 2.2 | Good | No adhesion |
| Example 22 | 2.0 | Good | No adhesion |
| Example 23 | 1.6 | Good | No adhesion |
| Example 24 | 1.2 | Good | No adhesion |
| Example 25 | 0.8 | Good | No adhesion |
| Comparative Example 7 | 3.0 | Cracking outside and inside | Adhesion |

As is clear from the results of Table 3, in Examples 19 to 25, shape retention and prevention of pressure increase were possible during molding by controlling the mixing ratio of thermoplastic resin in the binder at 35 to 80% by weight. As a result, molded honeycomb materials having a small partition wall thickness and large cell density could be obtained satisfactorily.

As is clear from the results of Table 4, in Examples 19 to 25, it was possible to reduce the amount of expansion, the amount of cracking and the adhesion to the setter during dewaxing and firing.

According to the present invention, a molded honeycomb material having a small partition wall thickness of 25 to 100 μm can be mass-produced efficiently without generating cracks or deforming the die of the extruder. Further, in the present invention, drying the molded honeycomb material is unnecessary due to the use of a water-insoluble binder. There is no plugging of the die caused by vacuum defoaming, and dewaxing is easy; therefore, productivity is further enhanced.

What is claimed is:

1. An extrusion molded honeycomb body having a plurality of partition walls defining a plurality of cells, comprising a mixture of a raw material powder and a binder, wherein no open pores are present in said honeycomb body and said binder comprises a thermoplastic material containing a wax and EVA, which is molten at a molding temperature at which said honeycomb body is extrusion molded, and wherein said partition walls have a thickness of 25 μm to 100 μm.

2. The extrusion molded honeycomb body according to claim 1, wherein a mixing ratio of said EVA in said binder is in a range of 35% to 80% by weight.

3. The extrusion molded honeycomb body according to claim 1, wherein a mixing ratio of said EVA in said binder is in a range of 40% to 70% by weight.

4. The extrusion molded honeycomb body according to claim 1, wherein a mixing ratio of said EVA in said binder is in a range of 45% to 60% by weight.

5. The extrusion molded honeycomb body according to claim 1, wherein said raw material powder comprises a ceramic powder.

6. The extrusion molded honeycomb body according to claim 5, wherein said raw material powder comprises cordierite.

7. The extrusion molded honeycomb body according to claim 1, wherein said raw material powder comprises a metal powder.

8. The extrusion molded honeycomb body according to claim 1, wherein said honeycomb material further comprises a catalyst for automobile exhaust gas purification.

9. A process for producing an extrusion molded honeycomb body having a plurality of partition walls with a thickness in a range of 25 μm to 100 μm defining a plurality of cells, comprising the steps of:

heating a mixture of a raw material powder and a binder containing a wax and EVA to a molding temperature to melt said binder;

extrusion molding said mixture to form an extrudate, wherein no open pores are present in said extrudate; and cooling and solidifying said extrudate.

10. The process according to claim 9, wherein said extrusion molding step comprises continuous kneading and extrusion molding.

11. An extrusion molded honeycomb body having a plurality of partition walls with a thickness in a range of 25 μm to 100 μm defining a plurality of cells, comprising a mixture of a raw material powder and a binder, wherein no open pores are present in said honeycomb body and said binder consists of a thermoplastic material containing EVA, which is molten at a molding temperature at which said honeycomb body is extrusion molded.

12. The extrusion molded honeycomb body of claim 1, wherein said mixture is non-aqueous.

13. The process for producing an extrusion molded honeycomb body according to claim 9, wherein said mixture is non-aqueous.

14. The extrusion molded honeycomb body of claim 11, wherein said mixture is non-aqueous.

* * * * *